(12) United States Patent
Bogiatzis

(10) Patent No.: US 9,199,717 B2
(45) Date of Patent: Dec. 1, 2015

(54) CENTER FUSELAGE BELLOWS

(75) Inventor: Christos Bogiatzis, Stuhr (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 234 days.

(21) Appl. No.: 13/267,354

(22) Filed: Oct. 6, 2011

(65) Prior Publication Data

US 2012/0261510 A1    Oct. 18, 2012

Related U.S. Application Data

(63) Continuation of application No. PCT/EP2010/054512, filed on Apr. 6, 2010.

(60) Provisional application No. 61/167,010, filed on Apr. 6, 2009.

(30) Foreign Application Priority Data

Apr. 6, 2009   (EP) .................................... 09157424

(51) Int. Cl.
| | |
|---|---|
| *B64C 1/00* | (2006.01) |
| *B64C 1/26* | (2006.01) |
| *B64C 7/00* | (2006.01) |
| *F16J 15/52* | (2006.01) |

(52) U.S. Cl.
CPC ... *B64C 1/26* (2013.01); *B64C 7/00* (2013.01); *F16J 15/52* (2013.01)

(58) Field of Classification Search
USPC .............. 244/119, 120, 130, 131, 132, 123.1, 244/117 R, 121, 129.1, 100 A; 403/335–379, 403/199
See application file for complete search history.

(56) References Cited

U.S. PATENT DOCUMENTS

| | | | | |
|---|---|---|---|---|
| 2,443,751 | A | * | 6/1948 | Terepin et al. ................ 244/121 |
| 2,638,292 | A | * | 5/1953 | Horne et al. .................. 244/121 |
| 2,659,462 | A | * | 11/1953 | Schwartz et al. .............. 52/200 |
| 2,784,926 | A | * | 3/1957 | Bonza et al. ............... 244/129.3 |

(Continued)

FOREIGN PATENT DOCUMENTS

| | | |
|---|---|---|
| CN | 101323370 A | 12/2008 |
| DE | 1928484 A1 | 12/1970 |

(Continued)

OTHER PUBLICATIONS

International Searching Authority, International Search Report dated Jul. 22, 2010 for Application No. PCT/EP2010/054512.

(Continued)

*Primary Examiner* — Tien Dinh
*Assistant Examiner* — Assres H Woldemaryam
(74) *Attorney, Agent, or Firm* — Ingrassia Fisher & Lorenz, P.C.

(57) ABSTRACT

A sealing assembly is provided in an airframe of aircraft. The sealing assembly includes, but is not limited to a resilient and yet stiff enough bellows body that is attachable to the fuselage of the aircraft and is further attachable to a center wing box of the aircraft. The sealing assembly seals off a gap between the fuselage and the center wing box so as to allow maintaining pressure in the fuselage if the fuselage is pressurized. The bellows body is a composite and is designed to sustain exposure to tear and wear and exposure to a high and low temperatures as well as exposure to chemicals used during operation of the aircraft.

17 Claims, 10 Drawing Sheets

(56) References Cited

U.S. PATENT DOCUMENTS

| | | | |
|---|---|---|---|
| 3,279,721 A | 10/1966 | Dethman | |
| 3,480,237 A | 11/1969 | Appleby | |
| 3,510,088 A | 5/1970 | Bird et al. | |
| 3,512,847 A | 5/1970 | Link et al. | |
| 3,559,924 A | 2/1971 | Jochner | |
| 3,572,617 A | 3/1971 | Ricard | |
| 3,645,477 A | 2/1972 | Kratschmar et al. | |
| 3,680,815 A | 8/1972 | Deplante | |
| 3,734,431 A | 5/1973 | Rhodes et al. | |
| 3,797,784 A * | 3/1974 | Muller | 244/46 |
| 3,987,985 A | 10/1976 | Müller | |
| 4,029,272 A * | 6/1977 | Broadhurst | 244/46 |
| 4,485,993 A | 12/1984 | Mueller | |
| 4,690,352 A * | 9/1987 | Abdenour et al. | 244/49 |
| 4,720,061 A | 1/1988 | Abdenour et al. | |
| 6,092,764 A | 7/2000 | Geders et al. | |
| 6,877,695 B2 * | 4/2005 | Eveker et al. | 244/129.5 |
| 7,051,982 B1 * | 5/2006 | Johnson | 244/215 |
| 7,524,468 B2 | 4/2009 | Rizzi | |
| 7,607,614 B2 | 10/2009 | Rouyre | |
| 7,694,915 B2 * | 4/2010 | Mindermann et al. | 244/130 |
| 7,892,988 B2 * | 2/2011 | Pause | 442/131 |
| 2003/0066933 A1 | 4/2003 | Maury et al. | |
| 2004/0113016 A1 | 6/2004 | Eveker et al. | |
| 2007/0257151 A1 * | 11/2007 | Mindermann et al. | 244/130 |
| 2007/0257442 A1 * | 11/2007 | Mast | 277/391 |
| 2009/0146007 A1 * | 6/2009 | Keeler et al. | 244/119 |
| 2010/0170987 A1 * | 7/2010 | Meyer | 244/120 |
| 2010/0282907 A1 | 11/2010 | Hernandez | |

FOREIGN PATENT DOCUMENTS

| | | |
|---|---|---|
| DE | 2048577 A1 | 4/1972 |
| DE | 2113775 A1 | 10/1972 |
| EP | 0095939 A2 | 12/1983 |
| EP | 1593594 A1 | 11/2005 |
| GB | 706984 A | 4/1954 |
| GB | 758388 A | 10/1956 |
| GB | 1086151 A | 10/1967 |
| GB | 1215134 A | 12/1970 |
| GB | 1276585 A | 6/1972 |
| GB | 1364567 A | 8/1974 |
| RU | 375899 A1 | 11/2004 |
| WO | 2006008144 A1 | 1/2006 |

OTHER PUBLICATIONS

Extended European Search Report dated Dec. 3, 2009 for European Application No. 09157424.4.
Chinese Patent Office, Chinese Office Action for Chinese Patent Application No. 100004 dated Jul. 12, 2013.
Russian Patent Office, Russian Notice of Allowance dated Jan. 30, 2013 for Russian Patent Application No. 2011137962.

* cited by examiner

CENTER FUSELAGE BELLOWS

CROSS-REFERENCE TO RELATED APPLICATIONS

This application is a continuation of International Application No. PCT/EP2010/054512, filed Apr. 6, 2010, which was published under PCT Article 21(2) and which claims priority to European Patent Application No: 09 157 424.4 filed 6 Apr. 2009 and of U.S. Provisional Patent Application No. 61/167,010 filed 6 Apr. 2009, the disclosure of which applications is hereby incorporated herein by reference.

TECHNICAL FIELD

The technical field relates to the field of aeronautics. More particularly the technical field relates to a sealing assembly in an aircraft attachable to the airframe of an aircraft.

BACKGROUND

The need for reliable air transport means is ever increasing. Large cargo aircraft or cargo haulers have been devised in order to meet such demands for air transport.

Aircraft makers having distributed manufacturing facilities have found aircraft of the detached wing type to be useful. Detached wing type airframes have the wing structure detached from the fuselage, rather than having the wing structure integrally formed with the fuselage. This type of airframe allows manufacturing the wing structure in one manufacturing facilities whereas the fuselage structure can be manufactured elsewhere. The airframe may then be assembled by mounting the wing structure to the fuselage at yet another manufacturing facility.

The wing structure, fuselage and the empennage, make up the major components of the airframe. Those components are assembled in a manner so as to arrive at a structure providing the maximum amount of stability and reliability. For example, it is imperative to allow relative displacements between the airframe components in order to better absorb and propagate forces and so obtain a favorable behavior of the airframe to strain occurring during critical phases of aircraft operation. The landing phase may be one example of such a critical phase.

The need for stable and resilient airframe design holds particularly true in case of cargo aircrafts, which are used for example in military missions for troop and heavy equipment deployment. The requirement to cope with a payload in the range of tens of tons combined with the need for performing challenging flight maneuvers in possibly adverse weather conditions subjects the airframe to high tensile and compressive forces.

Designing the airframe to such high standards on stability and reliability often poses challenges to the equally important requirement to ensure that the fuselage stays pressurized during all flight conditions. This is because, especially in airframes of the detached wing type in high or low wing constructions, gaps within the airframe may be necessitated due to those design requirements. A variable geometry aircraft seal for swing-wing aircraft is disclosed in U.S. Pat. No. 4,029,272.

There is therefore a need for reliable sealing means to seal gaps in the airframe designs of the detached wing type. In addition, other needs, desirable features and characteristics will become apparent from the subsequent summary and detailed description, and the appended claims, taken in conjunction with the accompanying drawings and this background.

SUMMARY

In addressing at least parts of the above needs a sealing assembly is provided that comprises a bellows body. The bellows body is attachable or couplable to the airframe and is suitable to reliably seal off one or more gaps, openings or apertures or other pressure escapes in the airframe. In accordance with one embodiment, the bellows body of the sealing assembly is arranged and mounted between the wing structure of the airframe and the fuselage of the airframe.

More particularly, the airframe is of the detached wing type and the bellows body is attached to both, the center wing box of the wing structure and the upper portions of the center fuselage. The center wing box and upper portions of center fuselage are arranged at a distance to each other thus defining a gap in the wing carry-through section of the airframe. The gap can thus be sealed off by using the sealing assembly according to the invention.

The bellows body can be thought as an elongated sealing strip manufactured from a material having resilient or elastomeric consistency. Preferably the bellows body has a flat, curved or wavy cross-section with two length-wise side portions, one of the two length-wise side portions, edges or flap being attachable to the centering box and the other side portion, edge or flap being attachable to the fuselage.

However, it will be understood by those skilled in the art that the sealing assembly is also attachable to other structures in the airframe defining other gaps. The sealing assembly may for example be attachable to two structures in the fuselage or in the empennage or to interface structures between the empennage and the fuselage.

Although in circumstances attaching the sealing assembly direct to the airframe may be conceivable, mounting members are used for indirect attachment of the sealing assembly's bellows body to the airframe structures. This indirect way of attaching allows a more flexible construction, essentially implementing a "welted" construction principle. The mounting may be thought to serve as a "welt" for attaching the bellows body to attachment points in the airframe. This welted construction allows the sealing assembly to better compensate relative displacement between the airframe structures that are likely to occur during operation of the aircraft.

According to one embodiment the mounting members have contoured portions in order to receive and accommodate the side portions of the bellow body when so attached to the airframe. According to one embodiment, the contoured portions are arranged so as to match an outline of the respective surfaces of side portions of the bellow body. This allows for a snug and tight fit of the bellows body, thus providing even better sealing properties. The cabin pressure can be thus maintained even when the airframe needs to sustain relatively large relative displacements of the airframe structures to which the bellow body is attached.

According to another embodiment, the contoured portions are designed not only to ensure better sealing properties, but to provide a guiding function for a deflection which the so attached bellows body may undergo during operation of the aircraft. Deflection therefore occurs in a controlled manner rather than having the bellows body "wobble" uncontrollably.

According to yet another embodiment the contoured portions of the mounting members have crimped terminal portions. Those terminal portions are crimped so as to curl away from the bellows body when the bellow body is so attached to the airframe. The crimped terminal portions of the contoured portion prevents the bellow body from damage should the bellows body become deflected to such a degree that it makes contact with the contoured portion. The otherwise possibly sharp edges of the contoured portions can thus be prevented from cutting into the bellows body.

Mounting members having the contoured portions with the crimped edges are preferably arranged as J- or L-aluminum profiled bars. However, the exact shape of the aluminum profile bar may depend on the exact spatial relationship between the airframe structures defining the gap to be sealed.

According to yet another embodiment the bellows assembly further comprises a retainer member. The retainer members can be arranged as U profile aluminum bars arranged in such a manner that the each of the side portions of the bellows body is firmly sandwiched between one of the retainer members and the contoured portion of one of the mounting members. The end portions of the bellows body, the mounting members and the retainer members each have a series of holes arranged therein which are brought into registry when attaching the bellows body in order to pass bolts through the holes received on the other sides in sealed nuts to firmly affix and hold this three-part sandwich structure in place.

According to a further embodiment the mounting member has a drainage arrangement comprising for example a number of additional holes for draining the mounting member. Condense water or other liquids that may accumulate in the channel-like structures formed by the contoured portions can this be carried off According to yet another embodiment the drainage arrangement comprises hose fittings in registry with those additional holes. The hose arrangement has a hose attached to any one of the hose fittings in order to allow the water or other accumulated liquids to drain in a controlled manner.

According to one embodiment the bellows body is arranged as a composite material in a plurality of alternately stacked layers. The layers comprise layers of woven polyester fabric, layers of polyester, layers of silicon and layers of glass fiber. The polyester layer and the woven polyester fabric provide a support structure for the bellows body. During flight operations and when the cabin is pressurized, pressure exerted on the bellows body from the inside of the cabin bulges the bellows body outwardly due to pressurized environment within the fuselage. The polyester structure ensures that this bulging out and deformation of the bellows body occurs in a controlled manner rather than the bellow body, due to its resilient characteristic, ballooning in an uncontrolled way. The silicon layers add the required resiliency and suppleness whereas the glass fiber provides stiffness.

According to one embodiment, the layers are not only stacked but also laid out side by side inside and across the length of the bellows body. This vertical and horizontal arrangement of the layers allows for a better way of localizing desired properties where they are most needed: suppleness and resilience in or around the center portion and more stiffness in or around the two end portions of the bellows body. For example, according to one embodiment, the bellows body has two end portions that are joinable by overlapping the two end portions when the bellow body is attached to the airframe. The stiffness at the ends portions allows for a better fit of the bolts that are used to join the overlapped end portions.

The desired stiffness at the end portions for a firm fit of the nut-and-bolt joint. The stiffness so required at the end portions can thus be provided without comprising the desired resiliency of the bellow body required at the center portion thanks to the thicker silicon kernel layer embedded in the center portion of the bellows body.

In other words, the layers are so arranged that the amount of glass fiber is increased at the end portion of the bellows body or the bellows body sections whereas the amount of silicon is increased around the center portion of the bellows body or bellows body section. This converse distribution of the amounts of glass fiber and of the amounts of silicon may also be achieved by using glass fiber layers having different densities.

According to one embodiment the bellow body is arranged or formed by joining two or more bellow body sections and their respective end portions. This "modular" construction of the bellows body comprising a number of bellows body section facilitates maintenance in case bellows body incurs local damage. In this case only the specific bellows body section concerned needs replacement rather than replacing the entire bellows body.

According to yet another embodiment the end portions are chamfered, beveled or have a step-profile to ensure uniform overall thickness of the bellow body when the end portions of bellows body or sections thereof are joined by overlapping.

BRIEF DESCRIPTION OF THE DRAWINGS

The invention will be described in detail hereinafter with reference to the drawings, in the figures like numerals designate like parts, and the figures are not to scale, where.

DETAILED DESCRIPTION

Figure 1:
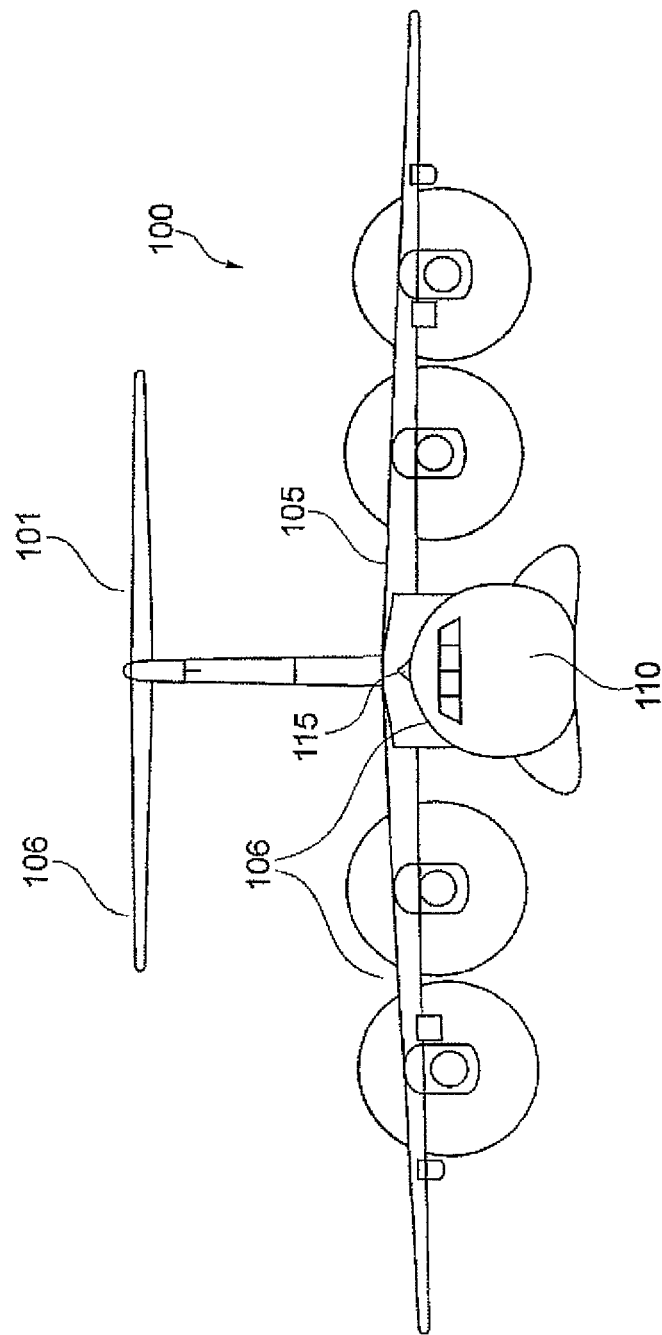
FIG. 1 shows a high wing aircraft having a detached wing structure.

The following detailed description is merely exemplary in nature and is not intended to limit application and uses. Furthermore, there is no intention to be bound by any theory presented in the preceding background or the following detailed description Reference is now made to FIG. 1 showing a high wing aircraft 100 of the detached wing type. The aircraft 100 has a wing structure 105 that is detached from the fuselage 110. In other words, the wing structure 105 is not integrally formed with the fuselage 110. The wing structure 105 is mounted on a central portion, the center fuselage, of the fuselage 110.

Figure 2:
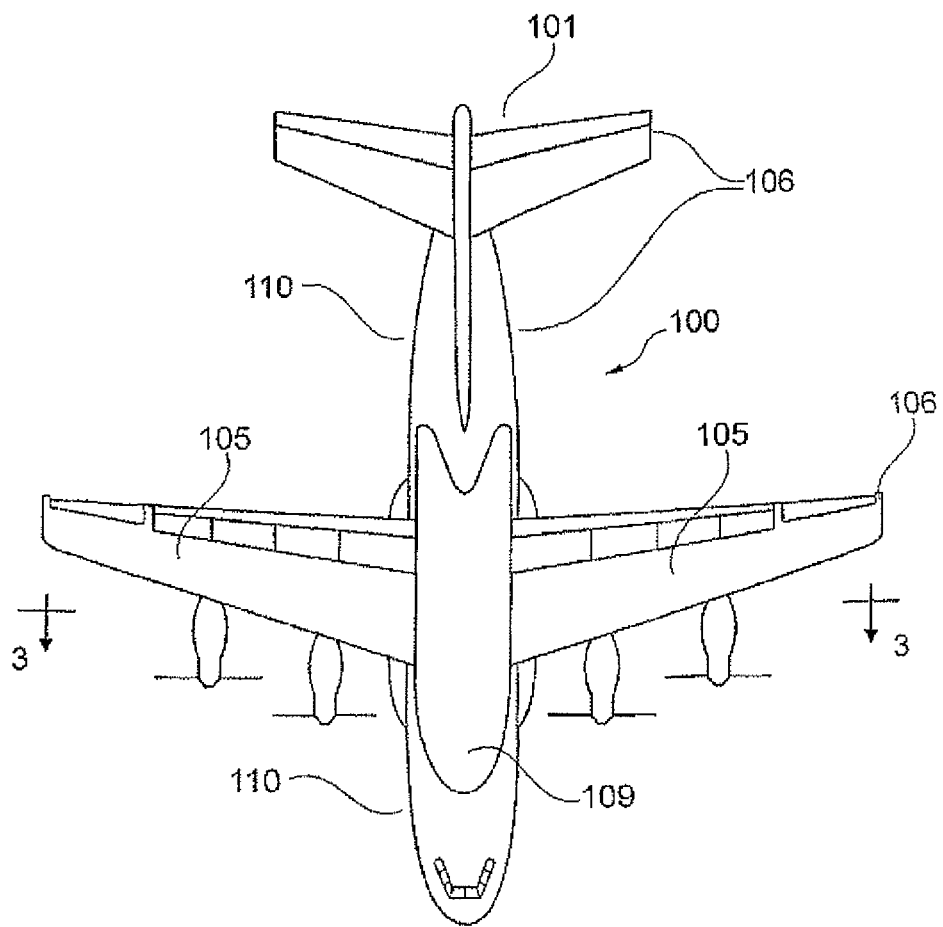
FIG. 2 shows a plan view of the aircraft of FIG. 1.

FIG. 2 is a plan view of the high wing aircraft 100 in FIG. 1. FIG. 2 affords a better overall view on the major components of the airframe 106 of aircraft 100. The airframe 106 comprises the empennage 101, fuselage 110 and the wing structure 105. The wing structure 105 is mounted at the center portion and on top of the fuselage 110. The wing structure 105 in detached wing type aircraft is a one-piece structure, the "wings" of the aircraft being formed by the wing structure 105 extending to the left and the right of the fuselage 110. The aircraft also has a fairing 109 arranged on top of the wing structure 105.

Figure 3:
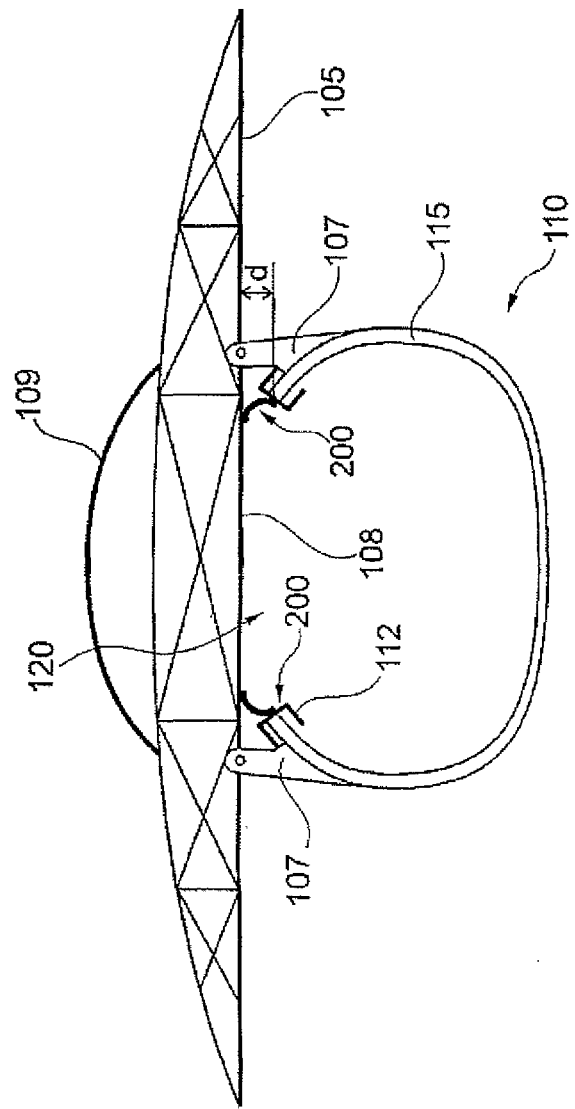
FIG. 3 is a cross-section view of the fuselage and wing structure in the aircraft along line 3-3 in FIG. 2.

FIG. 3 shows a cross-section along the line 3-3 in FIG. 2. The cross-section being defined by a plane passing through the root wing portion of the airframe 106. FIG. 3 shows clearly how the wing structure 105 and the fuselage 110 are arranged as two separate components of the airframe 106. The wing structure 105 abuts on mounting heads 107 arranged on the fuselage 110. The wing structure 105 is firmly bolted to the mounting heads 107 and held in place on top of the fuselage 110 by means of the mounting heads 107.

The fuselage 110 has a substantially cylindrical shape. FIG. 3 also shows a carry-through section 120 for partly receiving the center wing box 108 of the wing structure 105. The carry-through section 120 is a cut-out in the cylindrical fuselage 110. The wing carry-through section 120 is defined by a distance d between the center wing box 108 of the wing structure 105 and the upper edges of semi ring frames 115. There are a number of semi- or open semi ring frames 115 arranged side-by-side, the number of semi rings frames 115 making up the center portion of the fuselage 110. The center wing box 108 does not about the semi ring frames 115. The detached wing type construction results in a gap of width d in the airframe 106 which is sealed off by means of the sealing assembly 200. The sealing assembly 200 is attached to the center wing box 108 and a C-beam element 112 disposed on the upper edges of the semi ring frames 115 so as to cap those edges and to so provide sound support for the sealing assembly 200. The sealing assembly ensures the fuselage 110 remains pressurized during operation of the aircraft 100.

Figure 4:
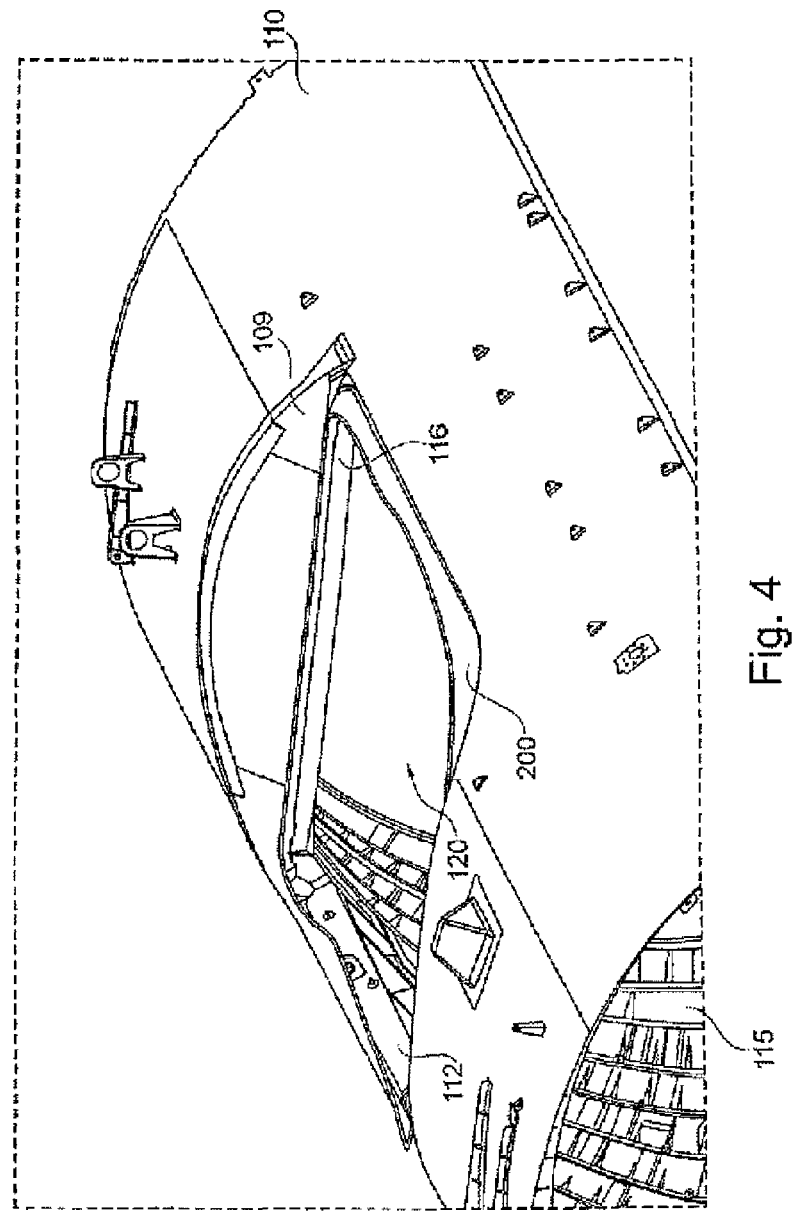
FIG. 4 is a perspective, partly cut-away view of the wing carry-through section in the fuselage of the aircraft in FIG. 1.

A perspective view on the carry-through section 120 is provided by FIG. 4. For clarity, the wing structure 105, including the center wing box 108, and the mounting heads are 107 are cut away. The cylindrical shape of the fuselage 110 outside the carry-trough section 120 is defined by ring frames 117. The rings frames 117 are similar to the semi ring frames 115, the later one having their center portions cut out so as to define the carry-through section 120. The wing carry-through section 120 has a rectangular periphery which is defined by two C-beams 112 arranged opposite to each other and two further C-beams 116 arranged in span-wise direction. Only one of the C-beams 112 is shown in the perspective view afforded by FIG. 4. The rectangular periphery has rounded corners in order to facilitate mounting of the sealing assembly 200 thereto. The sealing assembly is arranged all around the periphery and has one of its side portions or lower edge attached to the upper surfaces of the C-beams 112,116 making up the periphery and the other side, or upper edge potion attached to substantially to those portions or regions of the center wing box 108 facing those upper surfaces of the C-beams 112, 116. The exact points of attachment may however differ for other airframes having somewhat different geometries.

FIG. 4 shows how the bellows body 201 is laid out when attached to the fuselage 110 and the center wing box 108, both are components of the airframe 106. The bellows body 201, essentially a strip or band, has its upper and lower edges attached to the center wing box 108 and the fuselage 110, respectively. The two or more end portions of the bellows body 201 are arranged in one or more overlaps 205 so that the bellows body 201, when so arranged and attached, assumes the shape of a closed band or closed strip. The bellows body 201 assumes a curved cross section due to the pressure inside the pressurized area PA when the fuselage 110 is pressurized.

Figure 5:
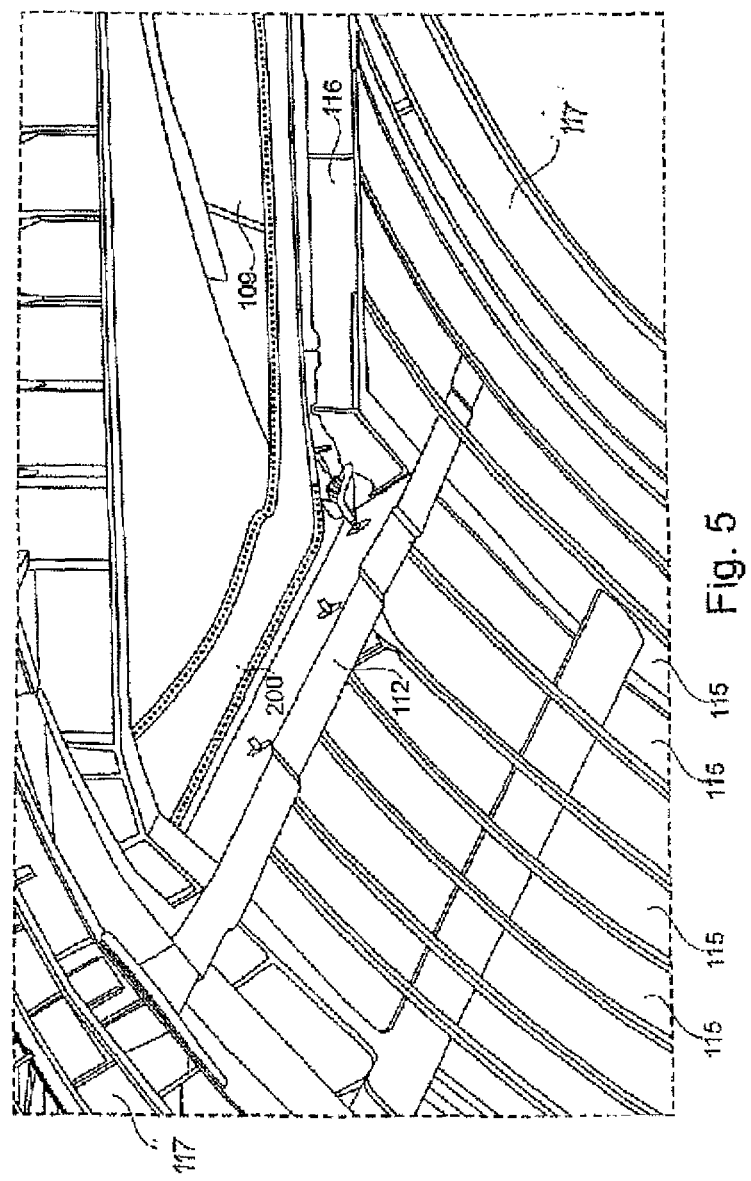
FIG. 5 is another perspective, partly cut-away view on the wing carry-through section of FIG. 4.

FIG. 5 affords another perspective view of the wing carry-through section 120. The perspective view is taken from a point inside the fuselage 110 and approximately underneath the wing carry-through section 120. Again, as in FIG. 4, the wing structure 105 is cut-away to better show the rectangular periphery around which the bellows body 201 is laid out as a sealing band.

Figure 6:
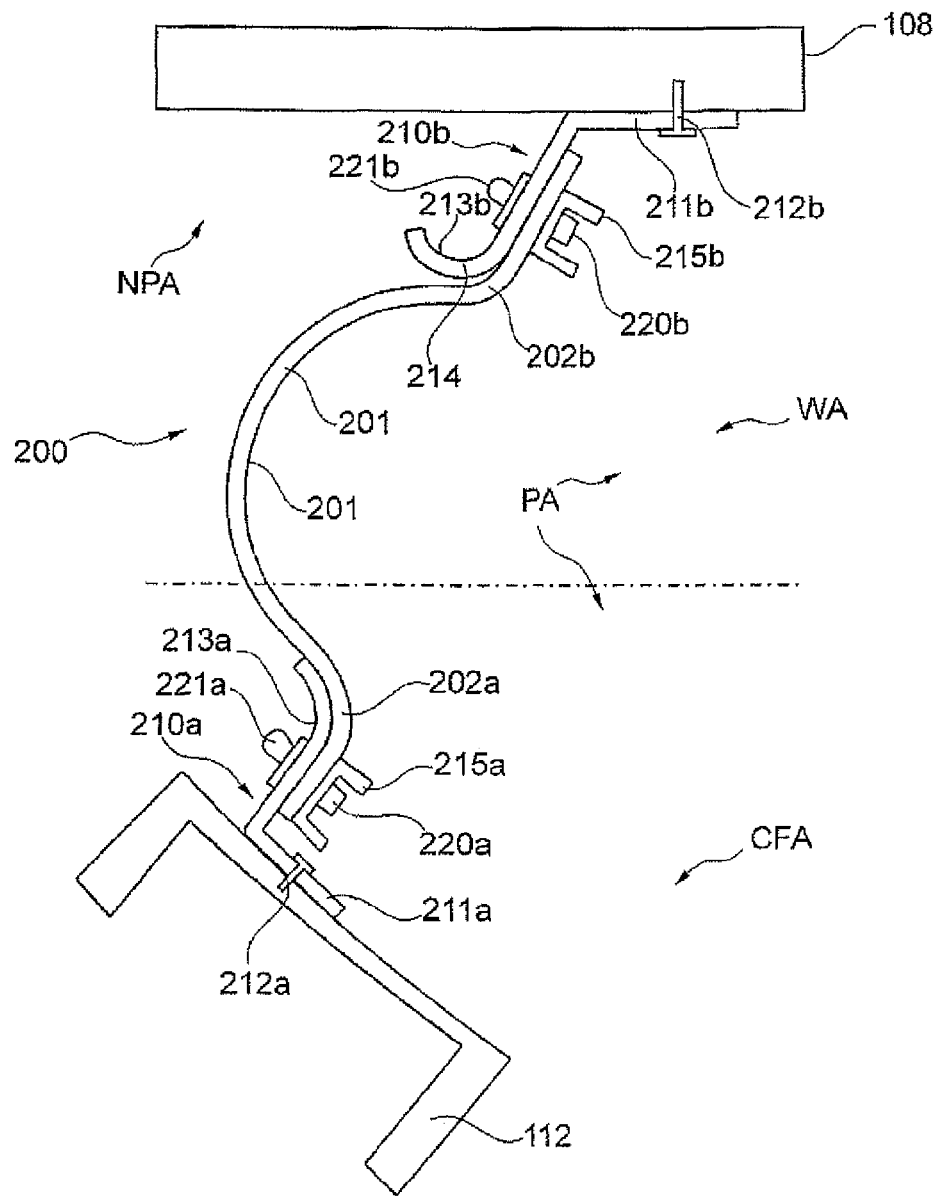
FIG. 6 is a close up sectional view on the sealing assembly according to the invention in FIG. 3.

FIG. 6 is a close up of the sealing assembly 200 as shown in FIG. 3. The cross-sectional view of the sealing assembly 200 as shown in FIG. 5 is exemplary and substantially the same all around the periphery. The sealing assembly 200 comprises a bellows body 201. The bellows body 201 is a polyester-glass fiber-silicon composite and is arranged as an elongate strip, which is mounted all around the rectangular periphery by means of the mounting members 210a and 210b. The dashed line in FIG. 5 demarks the wing area WA from the center fuselage area CFA.

The sealing assembly 200 allows pressurizing the pressurized area PA versus the non-pressurized area NPA to the left and outside of the fuselage 110. The sealing assembly 200 is not attached direct to the center wing box 108 and/or the C-beam 112. Attachment of the bellows body 201 is by means of the two mounting members 210a and 210b which are substantially similar. The bellows body 201 has a curved cross-section and has the two side portions 202a and 202b. The bellows body may be formed from two or more bellows body sections. The bellows body sections are joined to one another at their respective end portions so as to form a closed strip or closed band, or lop or ring. Reference to the side portions 202a and 202b and the end portions are therefore construed also as a reference to the respective side portions or end portions of the bellows body sections. The width of the bellows body is larger than the width of the gap, but is in the range of about 200-400 mm. The bellows body has a total length corresponding to the perimeter of the periphery and is about 12 meters. Again, the exact numbers are understood to differ depending on the geometry of the airframe.

As mentioned earlier, the bellows body 201 has preferably a curved cross-section to better sustain the pressure exerted on the bellows body 201 from the pressure inside the pressure area PA. The bellows body 201 may be extruded in shape to have the curved cross-section prior to mounting. Alternatively, the bellows body 201 may have a flat cross-section. In this case the width is chosen so that the bellows body is attached by way of the mounting members 210a,b with sufficient slack rather than stretched taut. The bellows body 210, when so attached, will then assume the curved cross-section as shown in FIG. 5 when the fuselage 110 is pressurized.

The mounting members 210a, b are arranged substantially as L- or J-profiled bars made from aluminum. The profiled mounting members 210a and 210b are also arranged in two or more profile sections having a total length of about the perimeter of the periphery. The members 210a,b or sections thereof are laid out one by one around the rectangular periphery of the carry-through section 120. Those sections of the profiled mounting members 210a, b that come to be laid out at the corners have a curvature corresponding to the curvature of the rounded corners.

The mounting members 210a,b each have a contoured portion 213a,b and a mounting portion 211a,b. An angle between the contoured portion 213a, b and mounting portions 211a, b may be so arranged such as to correspond to the relative spatial relationship between the upper surface of the C-beam 112 and the lower surface of the center wing box 108 to which the sealing assembly is attachable to. This allows aligning the bellows body in relation to those spatial relationships. If the sealing assembly 200 is attachable to other parts or structures defining a gap in the airframe 106 the angle may be manufactured to the local geometry.

The upper mounting member 210b on top of FIG. 5 has a larger angle than the lower mounting member 210a. Each of the mounting portions 211a,b of the mounting members 210a,b are attachable by suitable fixing means, such as rivets, to the center wing box 108 and the C-beam 112, respectively.

The sealing assembly 200 further comprises retainer members 215a,b. The retainer members 215a and b are arranged as U-profile bars made from aluminum. Similar to the mounting members 210a,b the retainers 215a,b may also have two or more sections, the sum of the lengths of each one of those sections totaling to about the perimeter of the periphery or substantially equal to the sum of the lengths of the profiled mounting members 210a,b.

The first end second end portions 202a and 202b of the bellows body 201 or of the bellows body sections are laid out to be brought into contact with the contoured portions 213a, 213b respectively. The end portions 202a, 202b are then sandwiched between the retainers 215a, 215b and the contoured portions 213a, 213b of the lower mounting member 210a and upper mounting member 210b, respectively. This sandwiched arrangement of the end portions 202a,b in between the respective contoured portion 213a,b, and the retainers 215a,b are then firmly held in place and affixed by means of a bolt 220a,b and a sealed nut 221a,b.

The contoured portions 213a,b, the end portions 202a,b and the retainers 220a,b each have a series of holes arranged therein which are brought in the registry with one another in order for the bolts 220 to pass through those holes. The threaded portions of the bolts are received by and threaded into the sealed nuts 221a, b, the heads of the bolts snugly abutting the horizontal surface of the U-profile retainers 215a,b. The sealed nuts are arranged on the side of the bellows body facing into the non-pressurized area NPA with the bolts 220a,b coming from the pressurized area PA.

The contoured members 213a, when the bellows body 201 is so attached, outline the cross-section form of the end portions 202a, b. The contoured portions thus not only enhance sealing but also allow guiding the deflection of the bellows body during operation of the aircraft. Deflection may be caused by relative displacements of the C-beam 112 and the center wing box 108 during challenging flight conditions of the aircraft and/or in adverse weather conditions. The contoured portions 213a,b have crimped terminal portions which are so crimped so as to curl away from the bellows body. Damage to the bellows body 201 can be thus prevented should the bellows body come into contact with the portion 213a or b while undergoing such deflections.

According to one embodiment, the contoured portion 213b has a drainage arrangement in form of drain holes 214 arranged along the contoured portion 213b. Those drain holes 214 allow draining condense water or fuel dripping from the center wing box 108.

Figure 7:
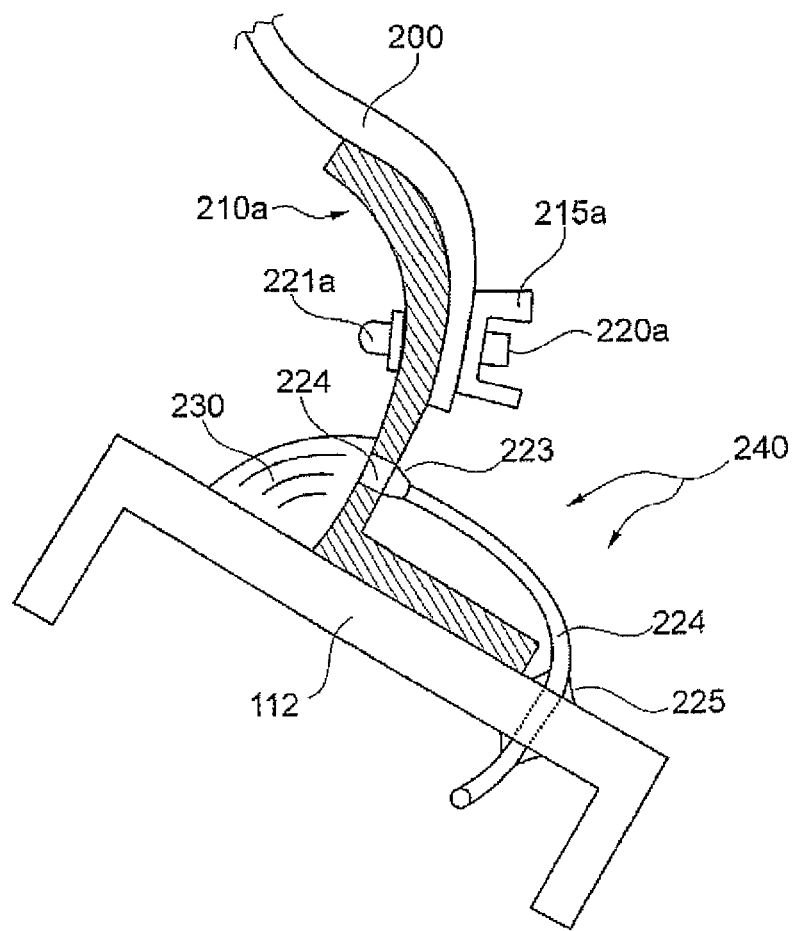
FIG. 7 is a close up sectional view of a mounting member of the sealing assembly in FIG. 6.

FIG. 7 is a close up of the mounting member 210a. In one embodiment the draining arrangement 240 further comprises one or more hose fitting 223 each arranged in registry with one the drain holes 214. A hose 224 is attached to the hose fitting 223. The hose 224 drains by way of a lead-through in the C-beam 112 into the non-pressurized area NPA. The lead through is furnished with a sealing 225 to not compromise pressurization of the fuselage 110. The draining arrangement 240 allows by way of the hose 224 to drain accumulated condensed water or fuel 230 in the trough-like arrangement between the C-beam 112 and the contoured portion 213a. The water 230 can be drained back into the non-pressurized area NPA and thrown clear in a controlled manner.

Figure 8:
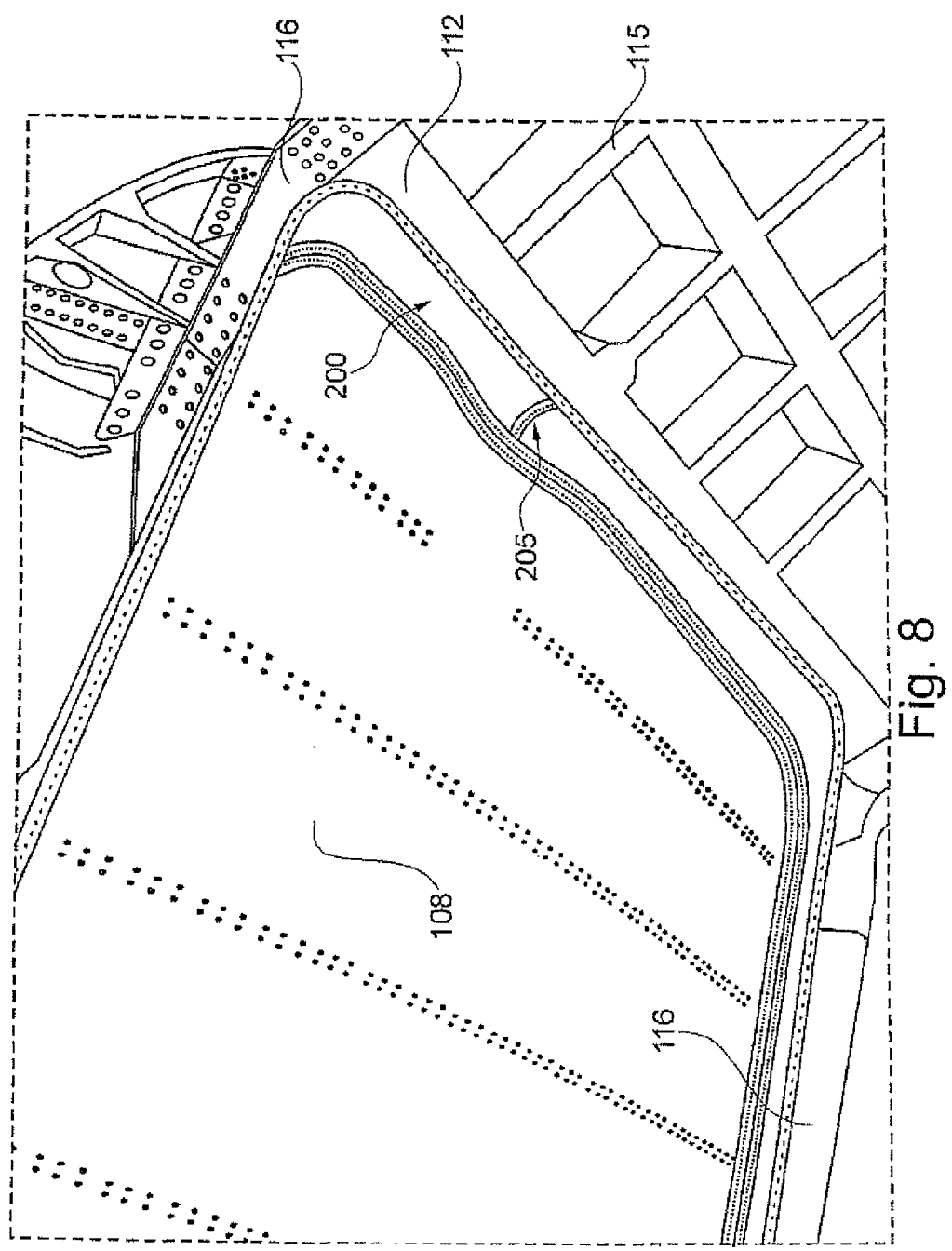
FIG. 8 is a perspective view taken from a point within the center fuselage on the sealing assembly attached to the airframe.

FIG. 8 is a perspective view on the sealing assembly 200 attached to the center wing box 108, the C-beams 112 and the C-beams 116 running in span-wise direction. FIG. 8 shows the bellows body 201 arranged all around the periphery of the rectangular periphery of the wing carry-through section. FIG. 8 also affords a view on how the elongate bellows body 201 when laid out and attached assumes the loop or ring shape. The Bellows body 201 of the sealing assembly 200 depicted in FIG. 8 comprises two bellow body sections joined at an overlap 205. The other overlap is not shown in the perspective view afforded by FIG. 8.

Figure 9:
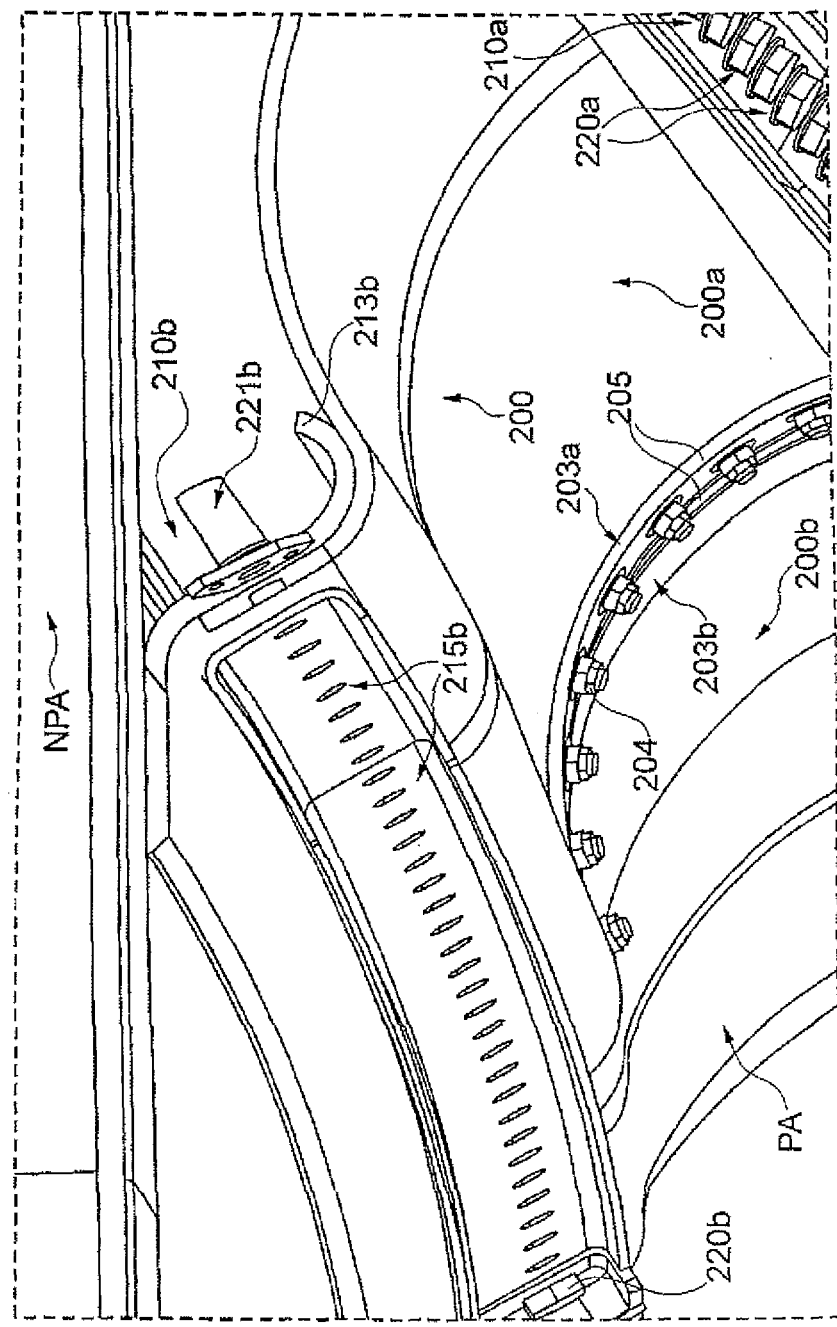
FIG. 9 is a perspective view on the bellows body of the sealing assembly partly cut away.

FIG. 9 shows a close up of that overlap 205 with cutaways. The end portion 203b of the respective bellows body sections are arranged in an overlapping manner. Each of the end portions or edges 203a and b has holes arranged therein which are brought into registry. The two end portions 203a and 203b are held in place by bolts receivable in nuts. According to one embodiment, the two end portions 203a and 203b are not only bolted but also glued together to form a fluid-tight bond. In this a dual affixing is affected, that is bolting and gluing, and the use of sealed nuts can be dispensed with at the overlap 205, thus driving down manufacturing costs.

In order to prevent the bolts cutting into the bellows body 201 during deflection of the bellows body the holes in the end portions 203a and 203b are furnished with aluminum grommets. The end portion are chamfered, beveled or have a "step" profile to ensure that the overall thickness of the bellows body is substantially constant. A thickening of the bellows body at the overlaps 205 can thus be avoided.

Figure 10:
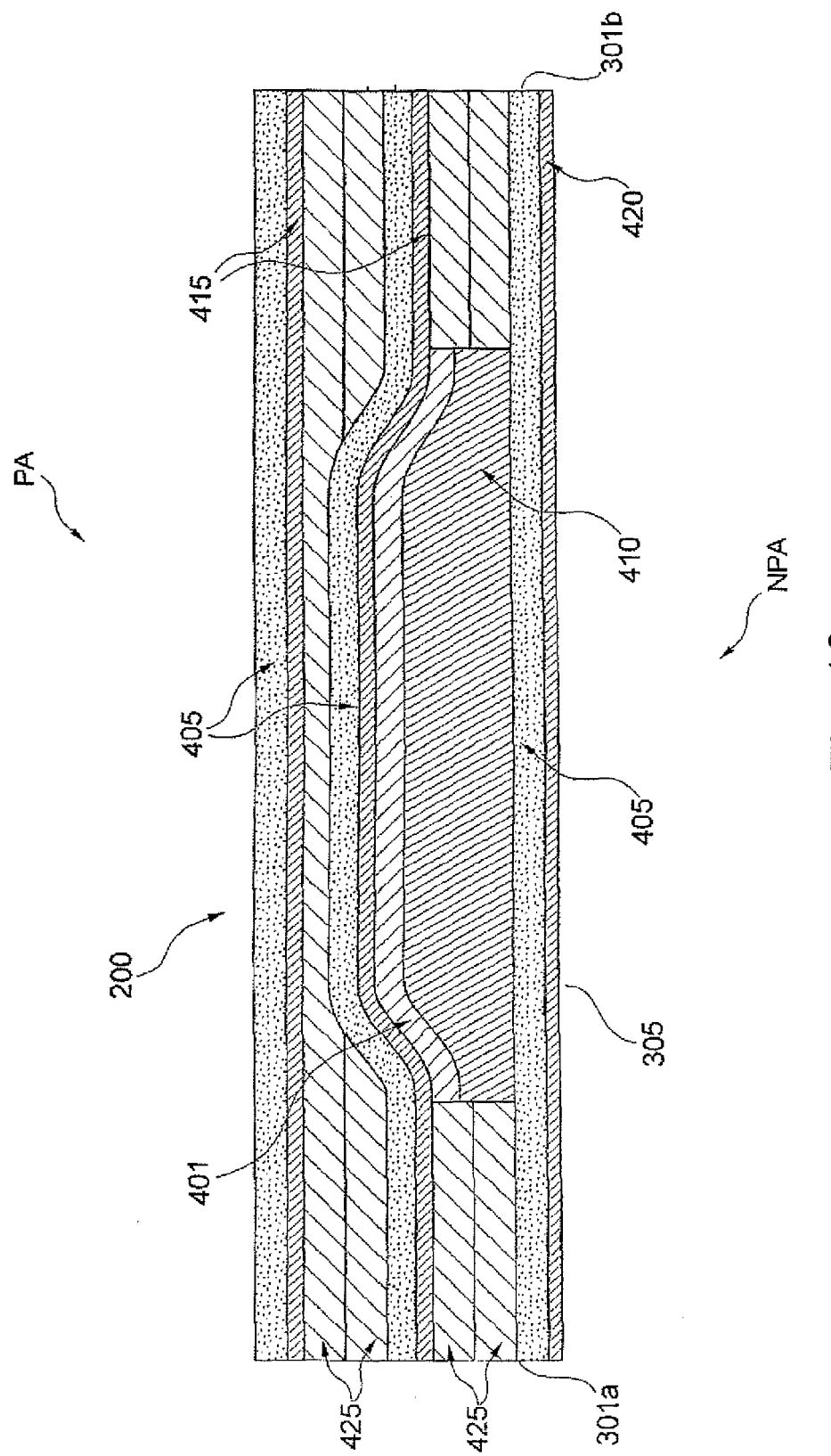
FIG. 10 is a length-wise cross-section view of a section of the bellows body in the sealing assembly.

FIG. 10 shows a length-wise cross-section through a bellows body 201 section having the two end portions 301a and 301b. The holes in each of the end portion 301a and b are not shown for clarity. The bellows body or the bellow body sections as depicted in FIG. 9 is arranged as a composite in a number of layers or lamina. The body section has a total width D of about 3 mm. The carrier substrate is arranged as three polyester fabric 405 layers and a layer of woven polyester fabric 401. On the pressurized side PA, one of those polyester layers 405 is the outermost layer. The outermost layer on the non-pressurized area NPA is formed by a low friction silicon layer 420 of about 0.14 mm thickness. This thin low friction silicon layer is designed to prevent damage of the bellows body and allows maintaining integrity of the bellows body should the bellow body come into contact with internal structure during operation of the aircraft. The bellows body would "slip off" the internal structure and thus prevent the structure cutting into the body.

Between the polyester fabric layers 405 there are arranged silicon layers 415 of about 1.5 mm thickness each. They account for the resilient character of the bellow body. As can be seen there is also a thicker silicon layer having a thickness of about 0.93 mm arranged in a center portion of the cross-section of the silicon body section. The thick silicon layer provides a silicon "kernel" 410 and does not extend all the way to the end portion 301a, b. To the left and right of the silicon kernel 410, there are arranged layers of glass fiber 425. In the embodiment shown in FIG. 9 there are arranged four layers of glass fiber each having a thickness of about 0.4 mm.

The amount of silicon in the region around the end portion 301a, b is therefore decreased, whereas the amount of glass fiber in that region is increased, The opposite holds true for the center portion of the bellows body 201 or the section thereof where the amount of silicon is increased whereas the amount of glass fiber is decreased.

This converse distribution across the lengthwise cross-section of silicon and glass fiber results in the bellows body 201 to be more supple and flexible in its center portion and stiffer due to the high amount of glass fiber therein in regions around the end portion 301a and 301b. The regions around or at the end portions 301a and b having the high amount of glass fiber therein have each a width which is taken in relation to a width of the head of the bolt used to join the bellow body sections. In this way it is ensured that the heads of the bolts abut the bellows body section where the amount of glass fiber is increased. In this way the necessary reinforcement required at the end portion can be provided without compromising the suppleness required at the center portion of the bellows body 210. Because the sections have different layers at their outermost sides, that is the low friction silicon layer on the one side and the outermost one of the polyester layers 405 on the other side, the chamfering of the bellows body sections must be executed in opposite direction to ensure that the low friction silicon layer and the outermost one of polyester layers 405 come to lie on different sides when joining the bellows body sections.

The composite structure of the bellows body 201 allows securing a number of desirable properties conducive to safe aircraft operation. The silicon-polyester-glass fiber composite layer structure of the bellows body 201 allows withstanding cabin and fairing pressures. The bellows body 201 is "high tear and wear" and sustains even comparably large deformations and deflections between the center wing box 108 and the fuselage 110. Further, the bellows body 201 also sustains impact of water, fuel, deicing and hydraulic fluids, for example Skydrol. The bellows body 201 is usable in temperature ranges between about −55° up to about +80°. Further, the bellows body 201 has an electrical conductivity in the range between about 10 and about 20 MOhm. It allows safe drainage of static electricity caused by dripping fuel from the center wing box 108 onto the bellows body 201.

The bellows body 201 has been designed on the assumption of the following boundary conditions: cabin normal pressure is about 550 mbar (limit load); cabin burst pressure is about two times 550 mbar equals about 1100 mbar (ultimate load); the WFF leak pressure is about −100 mbar (ultimate load); the cabin negative pressure equals about −75 mbar (ultimate load); the normal for teak pressure is 483 mbar (limit load); the bellows body 201 is snap through proof at about −80 mbar (limit load).

The bellows body 201 as used in the sealing assembly 200 according to an embodiment allows maintaining a pressurized atmosphere in the fuselage 110 during relative displacement in the airframe according to the following table:

| Relative Displacement [mm] in airframe sustained during flight operation | | |
| --- | --- | --- |
| z-vertical | x-parallel | y-lateral |
| +10/−17 | +/−7 | +/−8 |
| +21/−24 | +/−7 | +/−10 |
| +30/−30 | +/−12 | +/−12 |

While the foregoing summary and written description enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In addition it should be pointed out that "comprising" does not exclude other elements or steps, and "a" or "one" does not exclude a plural number. Furthermore, it should be pointed out that features or steps which have been described with reference to one of the above exemplary embodiments can also be used in combination with other features or steps of other exemplary embodiments described above.

What is claimed is:

1. A sealing assembly comprising:
   an elongate bellows body having a first end portion and a second end portion coupled together to form a closed ring and the ring forms a bellows, the bellows configured to attach to an airframe of an aircraft, the bellows further configured to seal off a gap in the airframe to allow pressurizing the airframe, when attached to the airframe;
   a first mounting member;
   a second mounting member;
   a first side portion of the bellows configured to attach via the first mounting member to the airframe;
   a first contoured portion of the first mounting member configured to accommodate the first side portion of the bellows;
   a mounting portion of the first mounting member configured to attach to the airframe;
   a second side portion of the bellows configured to attach via the second mounting member to the airframe;
   a second contoured portion of the second mounting member configured to accommodate the second side portion of the bellows; and
   a second mounting portion of the second mounting member configured to attach to the airframe,
   wherein the first contoured portion and the second contoured portion each comprise a crimped terminal portion, the crimped terminal portion crimped to curl away from the bellows when the bellows is attached to the airframe.

2. The sealing assembly of claim 1, wherein the first contoured portion and the second contoured portions are contoured to provide a guiding function for a deflection of the bellows during flight operation of the aircraft.

3. The sealing assembly of claim 1, further comprises:
   a first retainer member, the first side portion of the bellows sandwiched between the first retainer member and the first contoured portion of the first mounting member when the elongate bellows body is attached to the airframe; and
   a second retainer member, the second side portion of the bellows sandwiched between the second retainer member and the second contoured portion of the second mounting member when the bellows is attached to the airframe.

4. The sealing assembly of claim 1, the first mounting member comprising a drainage arrangement comprising at least one hole arranged in the first mounting member.

5. The sealing assembly of claim 1, the second mounting member comprising a drainage arrangement comprising at least one hole arranged in the first mounting member.

6. The sealing assembly of claim 4, the drainage arrangement further comprising:
   a hose fitting configured to attach to the at least one hole; and
   a drainage hose fitted to the at least one hole by way of the hose fitting and configured to drain, liquids accumulated in an interspace defined between the first mounting member of the sealing assembly and the airframe in a controlled manner.

7. The sealing assembly of claim 1, wherein the first and second end portions of the bellows overlap.

8. The sealing assembly of claim 1, wherein the first and second end portions are chamfered so as to ensure that an overall thickness of the bellows is substantially constant when the bellows is formed.

9. The sealing assembly of claim 1, the bellows having a flat cross-section when the sealing assembly is not in use.

10. The sealing assembly of claim 1, the bellows having a curved cross-section when the sealing assembly is not in use.

11. The sealing assembly of claim 1, the bellows having a wavy cross-section when the sealing assembly is not in use.

12. The sealing assembly of claim 1, wherein the bellows is arranged in a plurality of alternately stacked layers, the plurality of stacked layers comprising layers of polyester, layers of silicon, and layers of glass fiber.

13. The sealing assembly of claim 12, wherein the plurality of stacked layers in the bellows are arranged in such a manner that an amount of glass fiber increases whereas an amount of silicon decreases in a direction towards the first and second end portions of the bellows and that the amount of glass fiber decreases whereas the amount of silicon increases in a second direction towards a center portion of the bellows so as to impart to the bellows a higher degree of stiffness at or around the first and second end portions or side portions than at a center portion of the bellows.

14. An aircraft, comprising: a pressurizable fuselage; a center wing box of the aircraft extending at least partly into a pressurizable part of the pressurizable fuselage; internal to the aircraft, a sealing assembly including a bellows body, the bellows body having a first end portion coupled to a second end portion of the bellows body to form a closed band, and the bellows body seals off a gap between the pressurizable fuselage and the center wing box to maintain pressure in the pressurizable fuselage if pressurized; a first mounting member; a second mounting member; a first side portion of the bellows body configured to attach via the first mounting member to the pressurizable fuselage; a first contoured portion of the first mounting member configured to accommodate the first side portion of the bellows body; a mounting portion of the first mounting member configured to attach to the pressurizable fuselage; a second side portion of the bellows body configured to attach via the second mounting member to the center wing box; a second contoured portion of the second mounting member configured to accommodate the second side portion of the bellows body; and a second mounting portion of the second mounting member configured to attach to the center wing box.

15. The sealing assembly of claim 1, wherein the crimped terminal portion is curled away from the bellows in a manner so as to not permanently contact the bellows.

16. A sealing assembly comprising:
an elongate bellows body formed into a closed ring to define a bellows, the bellows attachable to an airframe of an aircraft, the bellows further configured to seal off a gap in the airframe to allow pressurizing the airframe;
a first discrete mounting member;
a second discrete mounting member;
a first side portion of the bellows coupled to the first mounting member and configured to attach via the first mounting member to the airframe;
a first contoured portion of the first mounting member shaped to accommodate the first side portion of the bellows;
a mounting portion of the first mounting member configured to attach to the airframe;
a second side portion of the bellows coupled to the second mounting member and configured to attach via the second mounting member to the airframe;
a second contoured portion of the second mounting member shaped to accommodate the second side portion of the elongate bellows body; and
a second mounting portion of the second mounting member configured to attach to the airframe,
wherein the first contoured portion and the second contoured portion each comprise a crimped terminal portion, the crimped terminal portion crimped to curl away from the elongate bellows body when the elongate bellows body is attached to the airframe.

17. The sealing assembly of claim 1, further comprising a nut and bolt connection that attaches at least the first side portion of the bellows to the first mounting member.

\* \* \* \* \*